United States Patent [19]
Kamiya et al.

[11] Patent Number: 5,071,263
[45] Date of Patent: Dec. 10, 1991

[54] PLANE BEARING

[75] Inventors: Soji Kamiya; Yuji Yokota, both of Aichi, Japan

[73] Assignee: Taiho Kogyo Co., Ltd., Toyota, Japan

[21] Appl. No.: 482,573

[22] Filed: Feb. 21, 1990

[30] Foreign Application Priority Data

Oct. 13, 1989 [JP] Japan ................................. 1-267694

[51] Int. Cl.⁵ ........................................... F16C 33/06
[52] U.S. Cl. ..................................... 384/284; 384/912
[58] Field of Search ................ 384/282, 284, 625, 95, 384/912

[56] References Cited

U.S. PATENT DOCUMENTS 4,400,099  8/1983  Ehrentraut .
4,561,787 12/1985  Ehrentraut et al. .
4,582,368  4/1986  Fujita ................................. 384/625
4,834,400  5/1989  Lebeck ............................... 384/625
4,878,768 11/1989  Fukuoka et al. ................... 384/625

FOREIGN PATENT DOCUMENTS 57-144313  9/1982  Japan .
60-205014 10/1985  Japan .
60-205015 10/1985  Japan .
62-283216 12/1987  Japan .

Primary Examiner—Lenard A. Footland
Attorney, Agent, or Firm—Armstrong, Nikaido, Marmelstein, Kubovcik & Murray

[57] ABSTRACT

In a plane bearing comprising a lining having first concavities on the surface thereof, and an overlay formed on the bonding layer, the seizure resistance of the bearing with worn overlay is enhanced by determining the first length of first concavities as seen in a direction perpendicular to a sliding direction non-equal to the second length of said first concavities as seen in the sliding direction.

7 Claims, 5 Drawing Sheets

PLANE BEARING

BACKGROUND OF THE INVENTION

1. Field of Invention

The present invention relates to a plane bearing particularly used in an internal combustion engine.

2. Description of Related Arts

The conventional plane bearing consists of a lining, a bonding layer formed on the lining, and an overlay. The lining consists of, for example, an aluminum bearing alloy. The bonding layer usually consists of Ni. The overlay consists of, for example, a Pb-based alloy which has good bearing property. The Pb-based overlay is described for example in DE 3000279A1.

When the overlay wears out during sliding, the entire surface of the bonding layer is exposed and brought into contact with the shaft. Since the bearing property of the bonding layer are exceedingly inferior to those of the overlay and the lining, seizure due to adhesion with the shaft quickly occurs.

The present applicant has proposed in Japanese Unexamined Patent Publication No 62-283,216 that minute unevenesses are formed on the surface of the lining, and, further, the bonding layer and the overlay protrude into the concavities of lining. When the overlay of the proposed bearing wears out to a certain extent that top portions of the lining appear, the bonding layer and the overlay appear as islands surrounded by the top portions of the lining. Therefore seizure resistance is better than the conventional case where the overlay is worn out and only the bonding layer is exposed.

SUMMARY OF THE INVENTION

It is an object of the present invention to further develop the plane bearing proposed in Japanese Unexamined Patent Publication No. 62-283,216 and to provide a plane bearing, whose seizure resistance under the wear of overlay is further enhanced.

The present inventors researched the shape of concavities which could increase the exposed surface area of the embedded overlay in the lining. The Japanese Unexamined Patent Publiction No. 62-283,216 disclosed that the concavities as seen in the plan view are such a shape that their dimensions in the sliding direction of a shaft and the direction perpendicular to the sliding direction have virtually the same ratio. This ratio is hereinafter referred to as the length ratio.

The shape of the concavities formed on the lining according to the present invention is characterized in that the length ratio is unequal.

The plane bearing according to the present invention comprises a lining having first concavities on the surface, and an overlay formed on the lining, characterized in that first length of the first concavities as seen in a direction perpendicular to the sliding direction is unequal to the second length of the first concavities as seen in the sliding direction. The shape of the first concavities is usually irregular but may be oblong.

The plane bearing according to the present invention may comprise a bonding layer formed on the lining and having second concavities which protrude into the first concavities of the lining. In this case the overlay is formed on the bonding layer The present invention is described hereinafter mainly with regard to the plane bearing comprising the lining, the bonding layer, and the overlay.

When the overlay wears somewhat there are still portions embedded in the first concavities, the seizure resistance of the inventive bearing is greater than that of known bearings, because the surface area of the overlay embedded in the first concavities of the lining of the inventive bearing is greater than that of any known bearing. This comparison is based on the assumption that the first length of the first concavities (formed on the lining) according to the present invention is equal to the average diameter of the known concavities proposed in Japanese Unexamined Patent Publication No. 62-283,216. Another assumption is that the bonding layer and lining of the inventive bearing are the same as those of known bearings.

The present invention is described hereinafter with reference to the drawings.

BRIEF DESCRIPTION OF DRAWINGS

FIG. 1 (B) is a drawing similar to FIG. 1 (A) and illustrates that the wear of the overlay layer advances to such an extent that the first concavities formed on the lining appear.

FIG. 1 (C) is a plan view of FIG. 1 (B).

FIG. 1 (D) is a drawing similar to FIG. 1 (C) and is a plan view of a known bearing.

FIG. 2 (A) is a vertical cross sectional view.

FIG. 2 (B) is a vertical cross sectional view and illustrates that the wear of an overlay advances to such an extent that the convexties of scratches are exposed.

FIG. 2 (C) is a plane view of FIG. 2 (B).

DESCRIPTION OF PREFERRED EMBODIMENTS

Figure 1A:
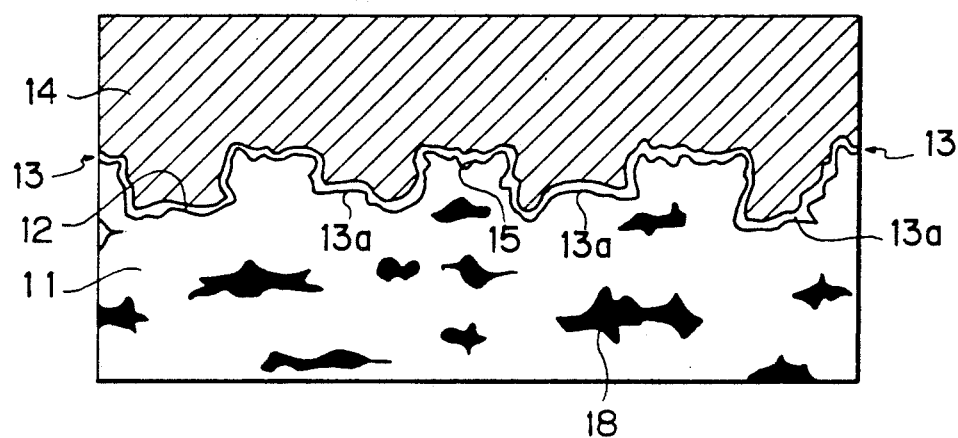
FIG. 1 (A) is a cross sectional view of the bearing according to an embodiment of the present invention.
Figure 1B:
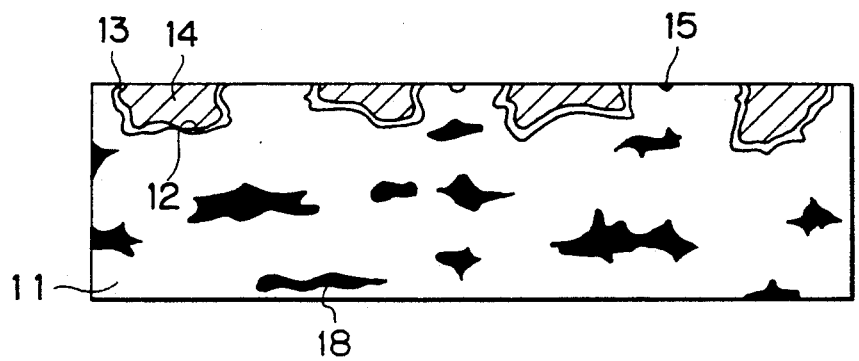
Figure 1C:
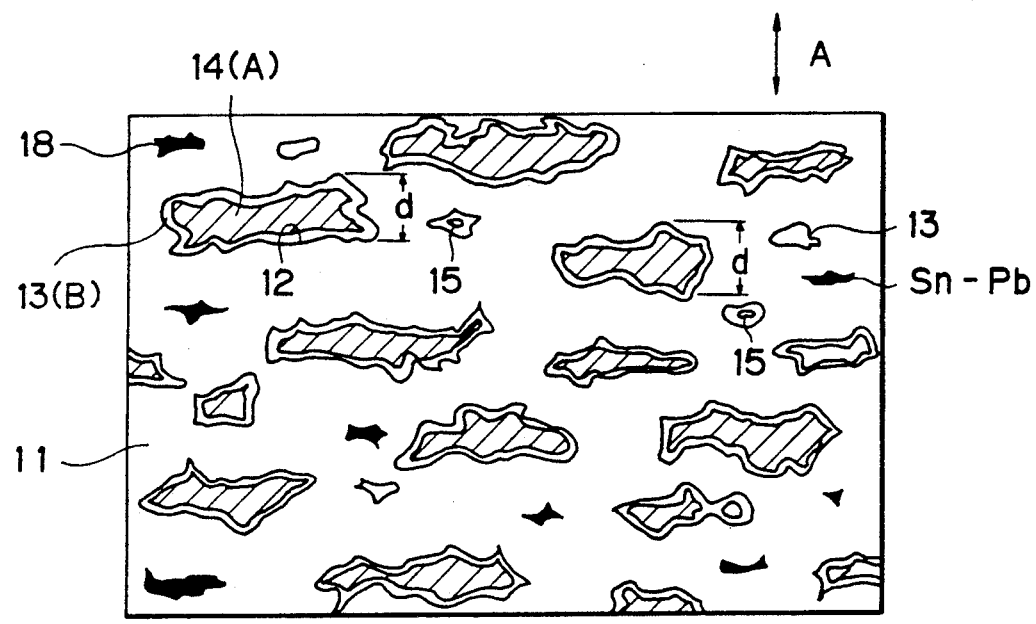
Figure 1D:
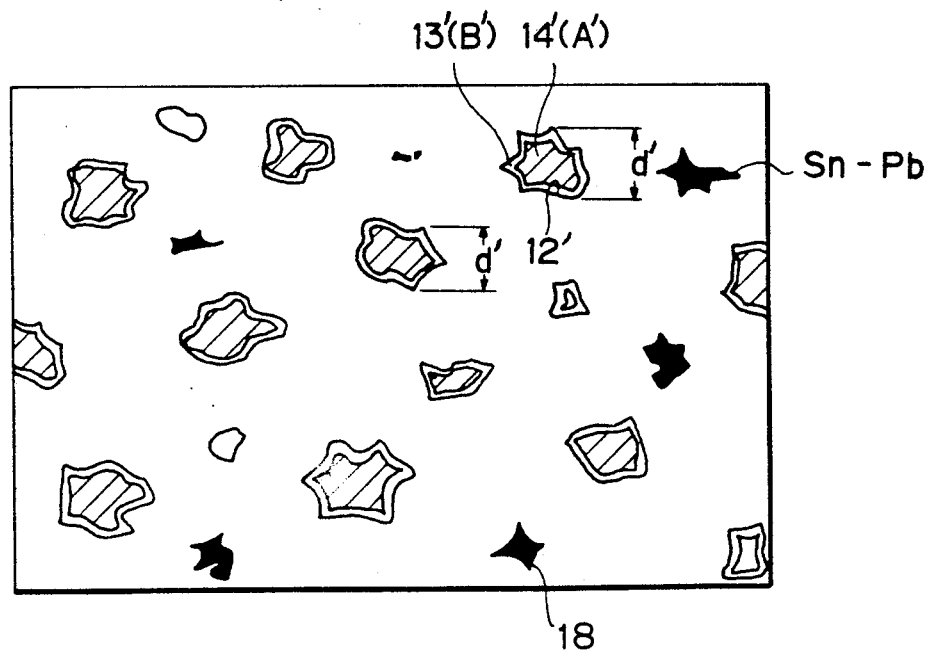

FIGS. 1 (A) through 1 (D) illustrate the first embodiment of the present invention. FIG. 1 (C) illustrates a comparative embodiment.

The lining 11 consists of for example an aluminum-alloy disclosed in U.S. Pat. No. 4,278,740 and U.K. Patent 2,027,050 B. The minute first concavities 12 (hereinafter simply referred to as the concavities) are formed on the surface of lining 11. As is schematically shown in FIG. 1 (C), the length of the concavities 12 in the direction perpendicular to the sliding direction (A) is greater than the length in the direction parallel to the sliding direction. The shape of concavities 12 is flat and irregular.

A backing metal (not-shown) is directly bonded to the lining 11 or is bonded to the lining 11 by a Ni plating layer or a pure Al layer.

The bonding layer 13 is formed on the lining 11 in such a manner that the former protrudes into the concavities 12 and forms the second concavities 13a on the surface of the bonding layer 13. The overlay 14 is formed on the bonding layer 13, so that the bottom part of the overlay 14 protrudes into the second concavities 13a of the bonding layer 13. The depth of the concavities 12 is preferably from 2 to 20 μm, more preferably from 2 to 10 μm. The thickness of the bonding layer 13 is preferably from 0.01 to 5 μm, more preferably from 0.01 to 2 μm. It is difficult outside these ranges to form the second concavities 13a because the (first) concavities 12 may be completely filled by the bonding layer 13.

When the overlay 14 of the plane bearing according to the present invention is worn out, and the convex portions of the lining 11 are exposed as schematically shown in FIG. 1 (B), the lining 11, the bonding layer 13, and the overlay 14 appear on the top surface of the bearing. Their configuration show an island-pattern, in which the bonding layer 13 and its surrounding overlay 14 are islands, and, further the lining 11 surround the islands. The ratio S (=A/B), in which A is surface area of the overlay 14, and B is the surface area of the bonding layer 12 in the inventive bearing, is greater than S' (=A'/B'), in which A' is the surface area of the overlay 14" (FIG. 1 (D)), and B' is the surface area of the bonding layer 13' of the known bearing. This theory S>S' is materialized by the assumption that the length (d) of inventive concavities 12 (FIG. 1 (C)) in the sliding direction A, is the same as the average diameter (d') of the known concavities 12' (FIG. 1 (D)), and further the thickness of the bonding layers 13 and 13' are the same as each other. When this assumption is fulfilled, the theory S>S' predicts that the seizure resistance of the inventive bearing is superior to that of the known bearing. This prediction well conforms with the results of the actual seizure test. The longitudinal direction of the concavities 12 are desirably orientated to the direction perpendicular to the sliding direction A of a bearing, i.e., the rotational direction of the shaft. It may however be orientated somewhat aslant to the direction perpendicular to the sliding direction A.

The concavities can be formed by the following method. The aluminum alloys which contain up to 20% by weight of such elements as Pb, Sn, In, and/or Tl are prepared, for example by a continuous casting to form a strip. These elements are dispersed as soft minority phases in a reticular form in the aluminum matrix of the aluminum alloy. The strip is then rolled in a single stage or a number of stages with the result that the soft minority phases 18 are rolled in the rolling direction. The soft minority phases become longer with the increase in the rolling ratio.

The annealing is carried out after the rolling. The hotrolling at a low temperature may be carried out in plural stages. In this case, the annealing is accomplished by the heat of the aluminum alloy. The strip is bonded with a backing steel. The annealing may then be carried out. The annealing condition is adjusted, typically 220°–400° C. for 5 hours, so that the elongated shape of soft minority phases does not revert to the generally nodular shape under the cast state.

The strip may not be bonded with the backing steel.

The bonded, lining and backing steel or the strip alone is then shaped in the form of a bearing. The so-shaped bearing, the lining, or the lining bonded with backing steel is then etched. The etching methods are alkaline etching, acidic etching, or alkaline etching followed by acidic etching. In the first mentioned alkaline etching, the natural oxide film on the lining and the soft minority phases are dissolved. The aluminum matrix of the lining may also be dissolved.

In the second mentioned acidic etching, such acids as capable of somewhat dissolving the natural oxide film and effectively etching the minority phases can be used. In the last mentioned alkaline etching followed by acid etching, the natural oxide film is dissolved by the alkaline agent, and the minority phases can then be dissolved by agent having the sulfuric, nitric or chromic radicals.

In the last mentioned method, the alkaline etching can be carried out in the same manner as in the first mentioned method. In this case, the dissolved minority phases are likely to remain as smut in the etched pores of the lining. Acid is then used to remove the smut from the etched pores.

The surface of lining is dissolved in a few $\mu$m by the etching. The concavities 15 are formed by the etching of the aluminum matrix and have length and width which are virtually the same as one another. Such concavities are not effective for enhancing the seizure resistance. The concavities 15 have 5 $\mu$m or less of diameter and 5 $\mu$m or less of depth.

The so formed concavities 12 have an irregularly flat shape. The shape irregularity is attributable to the fact that the concavities 12 are formed by etching the minority phases. because of shape irregularity, the border of the islands has a zigzag pattern. This pattern improves the bearing properties.

They are preferably present from 10 to 100 per field of 700 $\mu$m × 1000 $\mu$m. The depth of the concavities 12 in terms of roughness (Rz) is preferably from approximately 2 $\mu$m to 20 $\mu$m. When the depth is less than 2 $\mu$m, it is difficult to expose the lining 11, the bonding layer 12, and the overlay 14 on the flat surface of a worn bearing. On the other hand, when the depth is more than 20 $\mu$m Rz, the characteristics of bonding between the bonding layer 13 and the lining 14 are so poor, that the fatigue resistance is impaired. The length of the concavities 12 in the sliding direction A is less than in the sliding direction A and does not exceed 30 $\mu$m or less, while their length in a direction perpendicular to the sliding direction A is preferably from approximately 10 $\mu$m to 300 $\mu$m. When the length in the direction perpendicular to the sliding direction A is less than 10 $\mu$m, the area of the overlay 14 exposed on the worn surface of a bearing is not increased satisfactorily. On the other hand, when the length in the direction perpendicular to the sliding direction is more than 300 $\mu$m, fatigue resistance is impaired.

The longer length, i.e., the length perpendicular to the sliding direction A in the present embodiment, is preferably 1.5 times or more the shorter length, i.e., the length in the sliding direction A. When the ratio of longer length to shorter length is great, the bearing properties are excellent. However, when the ratio exceeds 20, the bearing properties become instable. The ratio is preferably from 2 to 10 from the view point of easiness of forming the concavities.

The lining 11 particularly suitable for the bearing according to the present invention, contains from 3 to 20% by weight of Sn, 10% or less by weight of Si, 2.5% or less by weight of Cu and/or Mg, 20% or less by weight of Pb, and, from 0.01 to 5% by weight of one or more of Cr, Mn, Zr, V, Mo, Co, Nb, Sr, Zn, and Sb.

The bonding layer 13 is a single layer or a plurality of layers which are formed by depositing one or more alloys such as Ni, Cu, Cr, Fe, and Zn with the aid of well known electroplating, dipping plating, and physical vapor deposition (PVD), e.g., sputtering. The bonding layer 13 is preferably from 0.01 to 5 $\mu$m thick, more preferably from 0.01 to 2 $\mu$m thick.

The overlay 14 is a layer from 1 to 25 $\mu$m thick which is formed by depositing a Pb-based alloy with the aid of wet plating, such as electroplating, or dry plating, such as sputtering or ion plating. The overlay 14 may be formed by spraying non-metallic solid lubricant such as graphite or $MoS_2$. Chemical conversion treatment of the lining 11 may be carried out to form a zinc calcium phosphate layer. In this case, the bonding layer can be omitted and the overlay 14 is preferably directly bonded on the lining 11.

Figure 2A:
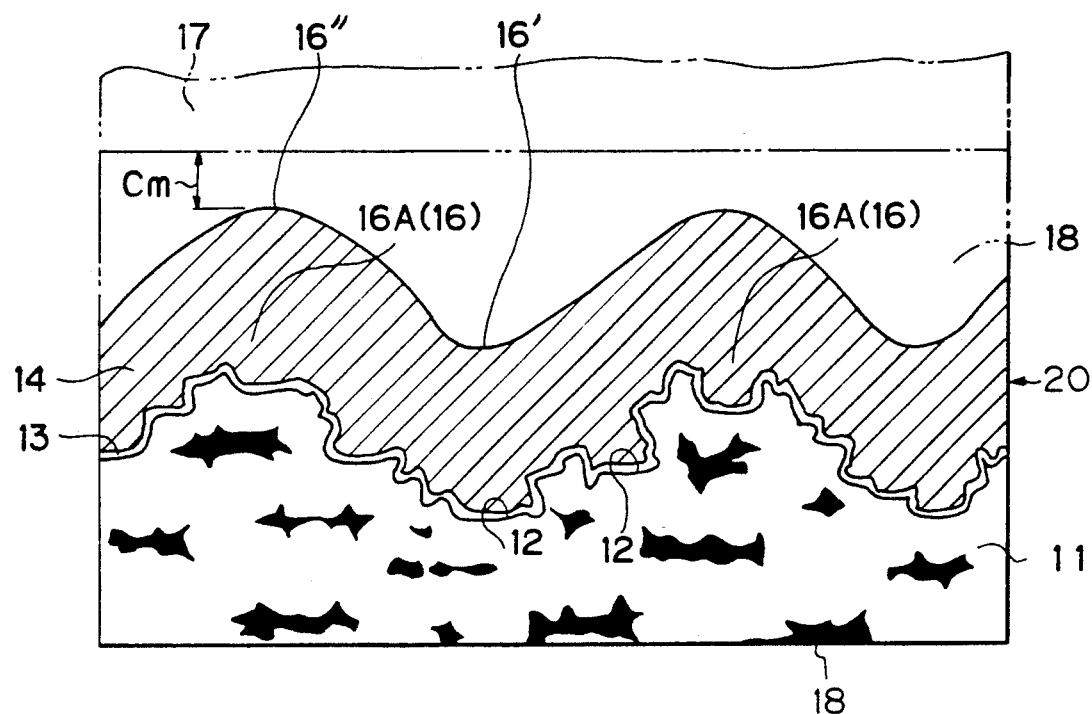
FIGS. 2 (A) through 2 (C) illustrate the plane bearing according to another embodiment of the present invention.
Figure 2B:
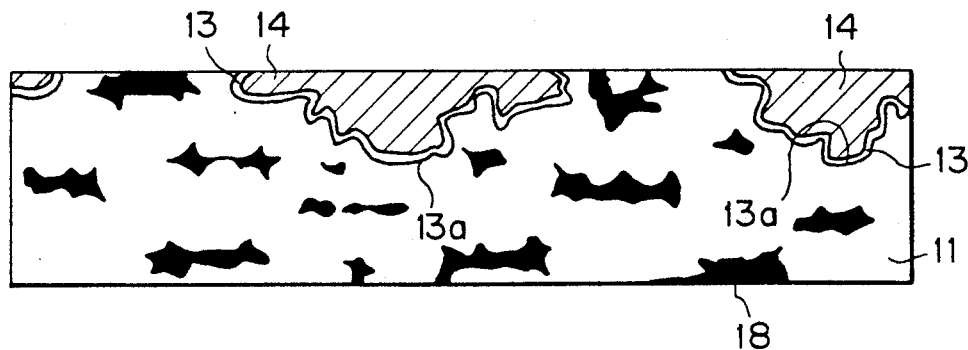
Figure 2C:
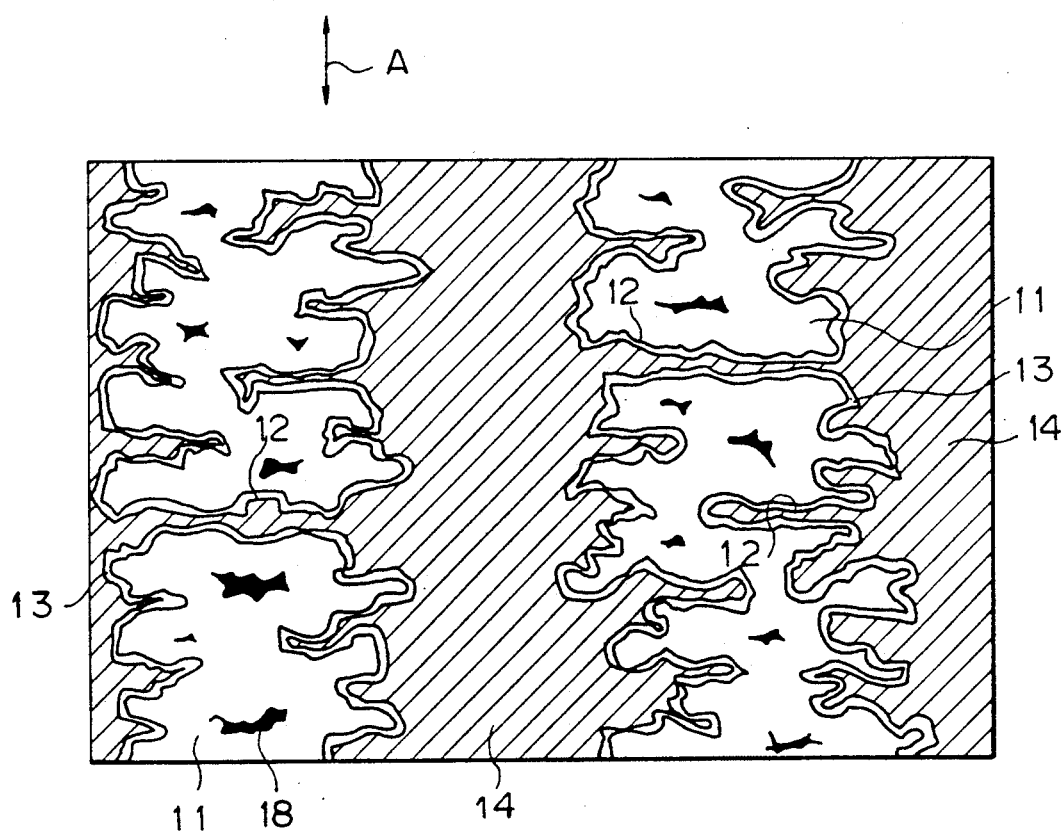

FIGS. 2A through 2C illustrate another embodiment of the present invention. Scratches 16 having an almost arc cross-section are formed on the surface of a sliding bearing 20 and are orientated in the sliding direction. The scratches 16 are formed by the boring of the lining 11. The concavities 12, which have an irregularly flat shape as described with reference to the already mentioned embodiment, are formed such that their longitudinal direction is substantially perpendicularly orientated to the direction of scratches 16. The bonding layer 13 and the overlay 14 are formed, as in the already described embodiment, on the lining 11.

Since the scratches are formed by a mechanical means not by the metallurgical and chemical means as described with reference to the first embodiment, overlay 14 according to the present embodiment has therefore large convexities 16'' and large concavities 16'. When the plane bearing is brought into contact with the shaft 17 (as in a crankshaft) the large convexties 16'' are brought into contact with the shaft 17, and the concavities 16' maintain a non-contact state. The contact area of the overlay 14 with the shaft 17 is therefore reduced in the present embodiment as compared with the case of the first embodiment having a totally flat surface of overlay 14, with the result being that friction loss is reduced in the present embodiment. Furthermore, the large concavities 16' are effective for retaining the lubricating oil between the shaft 17 and the overlay 14, with the result that the minimum oil clearance Cm (minimum clearance between the convexties 16'' and the shaft 17) can be reduced in comparison with the conventional sliding bearing, without incurring seizure.

When the sliding bearing is worn out to the extent that the lining apex 16 A formed by boring is exposed, the portions of the bonding layer 13 and the overlay 14 embedded in the concavities 12 are exposed (c.f. FIG. 2B). They (13, 14) have a configuration of islands isolated from each other by the lining 11. This leads to an increase in the surface area of the overlay 14. In addition, portions of the overlay 14, which are formed on the aslant surface of large convexties are broken along the lines parallel to the sliding direction (A) (c.f. FIG. 2(C)). If the aslant surfaces of the large convexties are not provided with (small) concavities 12 but are flat, the bonding layer formed on the aslant surfaces is likely to appear in the form of continuous lines when the overlay is worn out. In this case, portions of the shaft are brought into constant contact with the continuous lines of bonding layer mentioned above and are likely to quickly seize on the bearing. Contrary to this, the shaft slides not continuously on the bonding layer but slides intermittently on the bonding layer, overlay, and lining, with the result being seizure can be prevented with the present embodiment.

The scratches 16 are preferably from 1 to 15 $\mu$m, more preferably from 3 to 10 $\mu$m deep, and most preferably from 3 to 6 $\mu$m, and have preferably from 100 to 800 $\mu$m of pitch. When the depth is less than 1 $\mu$m, the retention of lubricating oil in the concavities 16' is unsatisfactory. In this case, friction loss at a low temperature is not reduced. On the other hand, if the depth is more than 15 $\mu$m, the load carrying capacity and durability of a plane bearing is impaired. Moreover when the pitch of scratches 16 is less than 100 $\mu$m, the retention of lubricating oil in the concavities 16' is unsatisfactory. In addition, the contact area between the overlay 14 and the shaft 17 is not reduced effectively so as to reduce the friction loss at a low temperature. On the other hand, when the pitch of scratches 16 exceeds 800 $\mu$m, the load carrying capacity and durability of a sliding bearing is impared.

The other constitutions of the present embodiment are the same as those of the first embodiment.

The present invention is described with reference to FIGS. 1 (A)-(C) for the embodiments where the first length is greater than the second length of the first concavities. However, the present invention is also applicable to an embodiment, in which the first concavities have the first length less than the second length. This embodiment is less advisable than the embodiments described hereinabove.

In the embodiment, in which the first length is less than the second length, the concavities can have a shape as shown in FIGS. 1 (A)-(C) or FIGS. 2 (A)-(C). In FIGS. 1 (A)-(C), the direction of arrow A, shown in FIG. 1 (C) corresponds to the first length, and in FIGS. 2 (A)-(C) the direction of arrow A corresponds to the second length.

The present invention is described hereinafter with reference to the examples.

Figure 3:
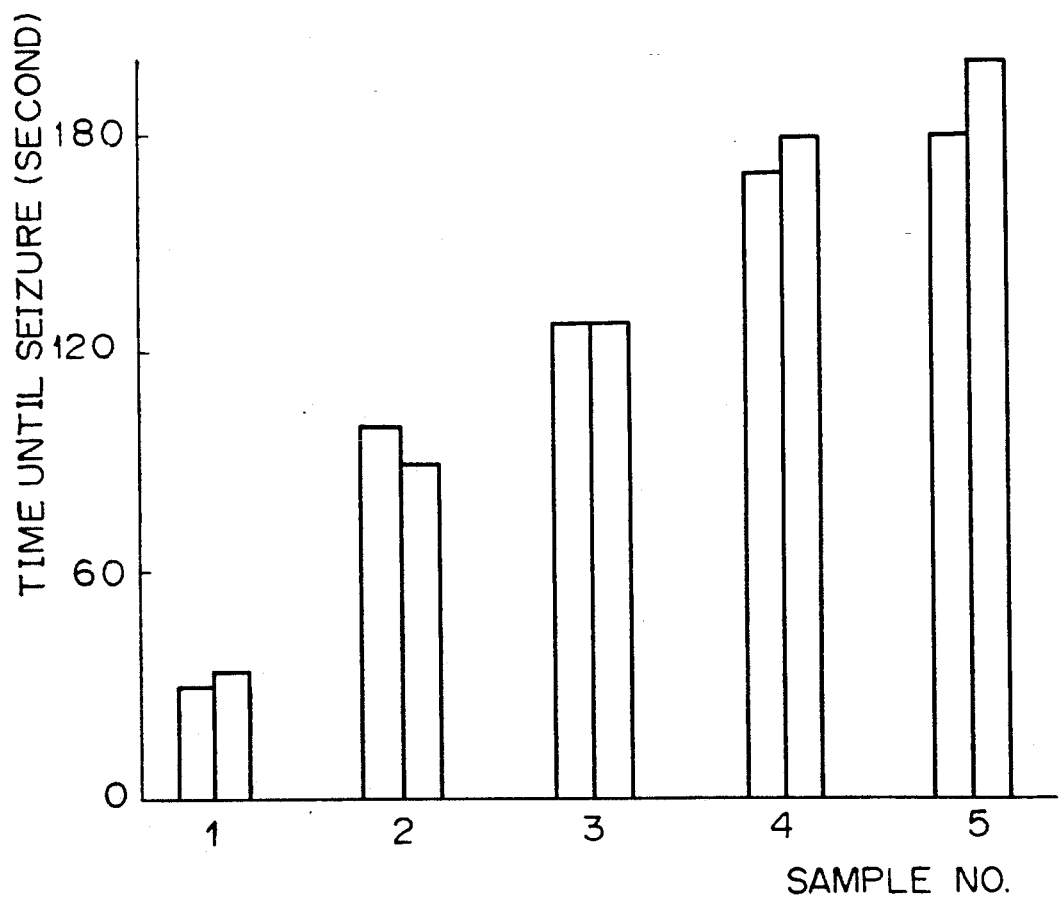
FIG. 3 is a graph showing the results of a seizure test.

The following five samples were subjected first to an operation so-called "running in" as the break-in operation. The temperature on the back side of plane bearings was measured after 20 hours of the running-in operation. The seizure test was subsequently carried out, and the time until seizure was measured. The results of the running-in operation are given in Table 1, and the results of the seizure test are shown in FIG. 3.

COMMON DATA OF SAMPLE NOS. 1-5

Backing steel: SPCC(JIS).
Lining (11) material: Al—12% Sn—1.5% Pb—3% Si—1% Cu—0.2% Cr. 0.25 mm (thickness).

Sample No. 1 (Comparative)

Bonding layer 13: Ni plating (3 $\mu$m thick).
Overlay 14: Pb—7% Sn—6% In (5 $\mu$m thick).

Sample No. 2 (Comparative. Japanese Unexamined Patent Publication No. 62-283,216)

Conventional concavities 12': 5 $\mu$m Rz.
Bonding layer 13': Ni plating (1 $\mu$m thick).
Overlay 14': Pb—7% Sn—6% In (5 $\mu$m thick).

Sample No. 3 (inventive)

Concavities 12:
Flat concavities formed by alkaline etching (100 g/l NaOH aqueous solution), followed by acidic treatment (150 g/l H$_2$SO$_4$, 35 g/l chromic acid aqueous solution).
5 $\mu$m Rz (thickness).
Average length in the sliding direction 12 $\mu$m.
Average length in the direction perpendicular to the sliding direction—80 $\mu$m. Number—approximately (55 per 700 $\mu$m $\times$ 1000 $\mu$m).
Bonding layer 13: Ni plating (1 $\mu$m thick).
Overlay 14: Pb—7% Sn—6% In (5 $\mu$m thick).

Sample No. 4 (Inventive)

Scratches: 5 $\mu$m in depth. Pitch—200 $\mu$m. Scratches are in the sliding direction.
Concavities 12: the same as in Sample No. 3.

Bonding layer 13: Ni plating (1 μm thick).
Overlay 14: Pb—7% Sn—6% In (5 μm thick).

Sample No. 5 (Inventive)

This is the same as Sample No. 4 except that the bonding layer 13 is a 1 μm thick Cu layer.

The running-in operation is of the following specification.
Rotation: 7,000 rpm.
Time: 20 hours.
Unit load on bearing: 230 kg/cm².
Temperature of oil fed: 140° C.
Lubricating oil: SAE 10 W-30.

The seizure test is of the following specification.
Rotation: 5,000 rpm.
Unit load on bearing: 120 kg/cm².
Temperature of oil: 140° C.
The lubricating oil is not fed.
Tester
Type: Journal type bearing tester.
Diameter of shaft: 40 mm.
Material of shaft: S50C (JIS) quenched.
Width of plane bearing: 17 mm.
Minimum oil clearance: 55 μm.
Surface roughness of bearing: 0.8 μm Rz.

TABLE 1

|  | Sample Nos. | | | | |
| --- | --- | --- | --- | --- | --- |
|  | Comparative | | Inventive | | |
|  | 1 | 2 | 3 | 4 | 5 |
| Temperature of the bearing back side Surface (°C.) | 176 | 172 | 169 | 162 | 160 |

The temperature of the bearing back side measured for the inventive bearings is less than that of the comparative bearings. A low temperature of the bearing back side indicates a high seizure resistance, as is apparent from FIG. 3. Since the bonding layer is not continuous along the sliding line in the inventive bearings, the heat generation on the sliding surface is small.

We claim:

1. A plane bearing, comprising:

a lining having first concavities on the surface thereof, each of said first concavities having a first length taken in a direction perpendicular to a sliding direction of said bearing, and a second length taken in a direction parallel to said sliding direction; and an overlay formed on said lining, wherein said first length of each of said first concavities is one and one half times greater than said second length in at least 90% of all of said first concavities, and wherein a number of between 10 and 100 of said first concavities are present per 700 μm × 1000 μm of area of said lining.

2. A plane bearing according to claim 1, wherein said first concavities have a depth of from 2 μm to 20 μm in terms of roughness (Rz).

3. A plane bearing according to claim 1, wherein said first length is from 10 μm to 300 μm and said second length is 30 μm or less.

4. A plane bearing according to claim 1, 2, or 3, wherein said lining consists of an aluminum-alloy which contains from 3 to 20% by weight of Sn, 10% or less by weight of Si, 2.5% or less by weight of Cu and/or Mg, 20% or less by weight of Pb, and, from 0.01 to 5% by weight of one or more of Cr, Mn, Zr, V, Mo, Co, Nb, Sr, Zn, and Sb, and the first concavities are formed by removing minority phases which essentially consist of one or more of Sn and Pb.

5. A plane bearing according to claim 1, 2, or 3, further comprising a bonding layer between the overlay and lining, having second concavities which protrude into the first concavities of the lining.

6. A plane bearing according to claim 5 wherein said lining consists of an aluminum-alloy which contains from 3 to 20% by weight of Sn, 10% or less by weight of Si, 2.5% or less by weight of Cu and/or Mg, 20% or less by weight of Pb, and, from 0.01 to 5% by weight of one or more of Cr, Mn, Zr, V, Mo, Co, Nb, Sr, Zn, and Sb, and the first concavities are formed by removing minority phases which essentially consist of one or more of Sn and Pb.

7. A plane bearing according to claim 5 wherein said bonding layer has a thickness of 0.01 to 5 μm.

* * * * *